United States Patent

[11] 3,550,777

[72] Inventor  Jack S. Singleton
               Sparta, N.J.
[21] Appl. No. 733,739
[22] Filed     May 23, 1968
[45] Patented  Dec. 29, 1970
[73] Assignee  Fluid Dynamics Incorporated
               Morristown, N.J.
               a corporation of New York
               Continuation of application Ser. No.
               678,280, Oct. 18, 1967, now abandoned.

[54] ADJUSTABLE FILTER ELEMENT
     3 Claims, 4 Drawing Figs.
[52] U.S. Cl. .................................................. 210/91,
                                              210/351, 210/488
[51] Int. Cl. ........................................................ B01d 27/00,
                                                      B01d 29/22
[50] Field of Search ............................................ 210/91,
                      350, 351, 457, 496, 488, 492, 506

[56] References Cited
     UNITED STATES PATENTS

| | | | |
|---|---|---|---|
| 730,485 | 6/1903 | Simoneton ................. | 210/350X |
| 1,061,928 | 5/1913 | Seavey ..................... | 210/351 |
| 1,293,114 | 2/1919 | Kendrick ................... | 210/488X |
| 1,955,158 | 4/1934 | Wells ....................... | 210/492 |
| 3,197,029 | 7/1965 | Yelinek et al. ............. | 210/91 |
| 3,238,056 | 3/1966 | Pall et al. ................. | 210/506X |
| 3,319,795 | 5/1967 | Schmidli ................... | 210/492X |
| 3,397,794 | 8/1968 | Toth et al. ................. | 210/488 |

Primary Examiner—Samih N. Zaharna
Attorneys—George D. Richards and Thomas Cifelli, Jr., Cifelli and Behr ABSTRACT: An adjustable filter element including a plurality of stacked compressible filter discs and a selectively adjustable loading plate for applying or releasing a columnar load upon the discs to compress or loosen them for varying the filter rating of the filter element.

PATENTED DEC29 1970
3,550,777
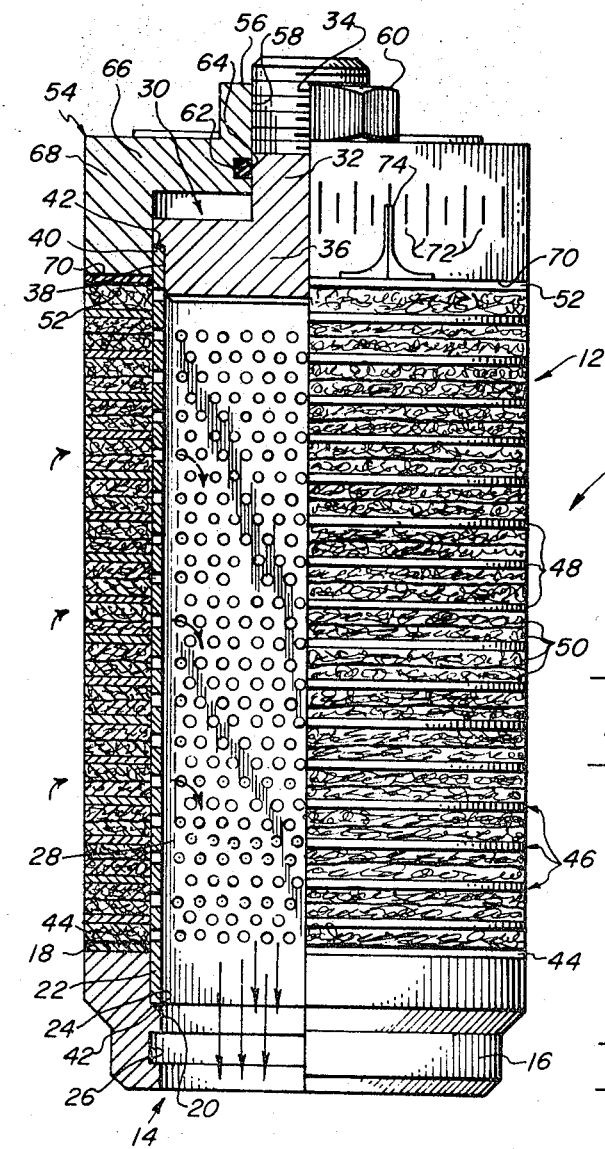
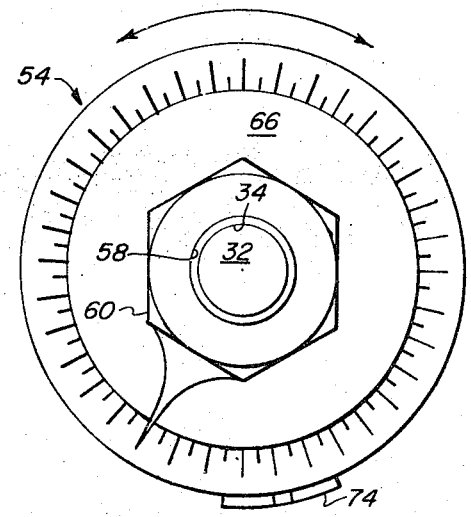
FIG.1
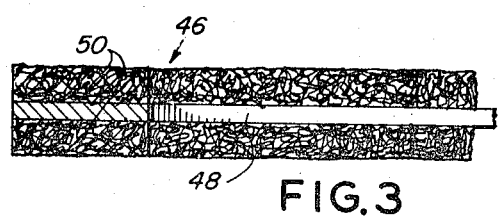
FIG.3
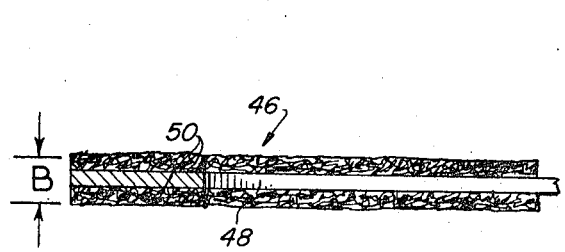
FIG.4
INVENTOR
JACK S. SINGLETON
BY
*Richards & Cifelli*
ATTORNEYS 3,550,777

ADJUSTABLE FILTER ELEMENT

This application is a continuation of my copending application Ser. No. 678,280, filed Oct. 18, 1967, now abandoned.

This invention relates to an improved filter element and more particularly to a filter which may be manually selectively adjusted to change the effective pore size through the filtering media.

Filter elements known to the prior art are generally specified for use on the basis of two parameters, namely (1) their size including diameter and length, and (2) their filter rating which rating denotes the effective pore size of the filtering media and indicates the particle size retentivity of the media. It is not uncommon for a given piping or power system to require several filter elements having different characteristics to be positioned at various locations therein, each filter element being appropriately selected to filter a contaminant of a given mean particle size. If however the gas or fluid passing through the system is found to include a contaminant of a different particle size it would be necessary to substitute a properly rated filter element. This obviously necessitates the high cost of purchasing and the storage of a large number of variously rated filter elements.

When the usual filter elements are fully saturated with contaminant particles and reduce the effective flow of the gas or fluid through the system it is the usual practice to clean the elements by back-flushing the gas or fluid through the elements to loosen and drive out the retained particles. This back-flushing must be accomplished at a relatively high pressure in order to dislodge the particles from the pores of the filtering media.

Accordingly it is the primary object of my invention to provide an adjustable filter element which may be purchased on the basis of only one of the above-mentioned parameters, viz. size, and which may be constructed simply and inexpensively in any desired length.

Another object of my invention is to provide an adjustable filter element having a unique filtering media construction comprising stacked compressible discs of a matted fibrous material.

Still another object of my invention is to provide an adjustable filter element which may be easily cleaned by increasing the pore size while back-flushing the gas or fluid through the element.

The objects of my invention are accomplished in one form, by providing an adjustable filter element with a support assembly including a foraminous tubular support core and an annular filtering media comprising a plurality of stacked annular filter discs encircling the core. The filter element also includes a selectively axially movable loading plate at one end of the filtering media being positioned to selectively apply and release an axial load to the filtering media to vary the filter rating of the media and indicator means to readily select the desired filter rating.

BRIEF DESCRIPTION OF THE DRAWINGS

Other objects and further details of that which I believe to be novel and my invention will be clear from the following description and claims taken with the accompanying drawing wherein:

FIG. 1 is a top plan view of my improved filter element;

FIG. 2 is a side elevational view of my novel filter partially broken away to show the internal construction;

FIG. 3 is an enlarged partial sectional view of a filter disc shown in its unloaded condition; and FIG. 4 is an enlarged partial sectional view of a filter disc shown in its fully loaded condition.

DESCRIPTION OF THE PREFERRED EMBODIMENT

With particular reference to FIG. 2 there is illustrated an adjustable filter element generally denoted by the numeral 10 through which a gas or fluid may pass in the direction of the arrows, i.e. radially inwardly through the porous cylindrical wall 12 and axially outwardly through the lower end 14. The filter element 10 includes an annular outlet fitting 16 positioned at its lower end having an upper planar support surface 18 and an inner cylindrical wall 20. A circumferential relieved portion 22 defining a shoulder 24 and a groove 26 adapted to receive an O-ring or other sealing means when assembled with a suitable coupling member are formed in the wall 20. A foraminous cylindrical support core 28 is positioned with its lower end within the relieved portion 22 adjacent the shoulder 24. An upper end fitting 30 includes an axial adjusting post 32 formed with a threaded portion 34 at its end and a cylindrical base portion 36 formed with a circumferential relieved portion 38 defining a shoulder 40. The base portion has an outer diameter of substantially the same dimension as the support core outer diameter, and the upper end fitting 30 is positioned within the support core so that the upper rim of the support core abuts the shoulder 40. The outlet fitting 16, the support core 28 and the upper end fitting 30 are permanently secured together by welds 42 or other suitable securing means and form a support assembly.

The support assembly is the structural base of my unique filter element and may be made in any desired length to satisfy the requirements of the system into which it is placed. This is simply achieved in manufacture or on the job by cutting the support core 28 to the length desired.

A lower bearing washer 44 made of a low friction material such as Teflon* (a trademark of Dupont) is positioned upon the support surface 18 of the outlet fitting 16. The filter media of my adjustable filter element comprises a plurality of annular filter discs 46 stacked upon the lower bearing washer 44 and encircling the support core 28 from its lower end to its upper end.

Each annular filter disc 46 (FIG. 3) comprises a central metal washer 48 made of stainless steel or other suitable material to which is secured on both planar faces thereof a random array of filaments also preferably made of stainless steel to form a resilient mat 50 upon each side of the washer 48. The mats are permanently affixed to the metal washer by a sintering process performed in a suitable heat treating furnace or they may be adhered thereto with an adhesive such as an epoxy. When secured in place upon the metal washer 48 the free portion of the mats 50 remain resilient and loosely matted having a free unloaded dimension indicated by the letter A as shown in FIG. 3. It should be understood that the free dimension A is indicative of a condition of maximum porosity of the filter disc 46. The mats 50 are capable of being selectively axially compressed to a minimum axial dimension indicated by the letter B in FIG. 4 in a manner to be fully described hereinafter. This dimension, of course, corresponds to a condition of minimum porosity of the filter disc 46.

An upper bearing washer 52 also made of Teflon* is positioned upon the stack of filter discs 46 and encircles the support core 28 to which it may be keyed in any known manner to be nonrotatable relative thereto. The adjustable filter element 10 of my invention is completed with the positioning of a loading plate 54 upon the adjusting post 32. The loading plate includes an axially extending portion 56 at one end having an internally threaded portion 58 and being formed with an adjusting nut 60 (see FIG. 1) on its outer surface. A groove 62 is defined therein for receiving an O-ring 64 or other suitable sealing means. The loading plate further includes a radially outwardly extending flange 66 which terminates in an annular axially extending loading wall 68 having a planar loading surface 70. Calibration lines 72 are scored or otherwise marked on the exterior surface of the loading wall 68 of loading plate 54 and suitable indicia (not shown) are also marked thereon after the filter has been calibrated. An indicator 74 fixedly secured to the upper bearing washer 52 or secured to the support core 28 completes the adjustable filter element 10.

Once assembled, the adjustable filter element must be calibrated in order to apply the appropriate filter rating indicia adjacent the scored calibration lines 72. Calibration is accomplished by subjecting the filter element 10 to a usual bubble point test over a range of possible filter ratings. Starting with the filter discs in their loose (dimension A) condition to determine the corresponding filter rating, the adjusting nut 60 is turned in a clockwise direction as viewed in FIG. 1 in suitable angular increments to compress the mats 50 for reducing the effective pore size of the filtering media to the maximum loading corresponding to the dimension B condition. In use, the user need merely turn the adjusting nut 60 in the clockwise or counterclockwise directions to the desired filter rating indicated by the indicator 74.

Another desirable feature of my adjustable filter elements is the ease with which they may be repeatedly recleaned. It is merely necessary to loosen the adjusting nut 60 in order to loosen the entire filtering media to a point where the resilient mats 50 return to their porous condition. By backflushing through the porous filter media the contaminating particles are easily driven therefrom. Alternatively it is simple to completely disassemble the element and then to clean each filter disc individually in a suitable solvent.

Having described my invention of an adjustable filter element it will be readily appreciated by those skilled in this art that a filter element employing my invention is simple in design and ingenious in operation. It should be understood that the present disclosure has been made only by way of example and that numerous changes in details of construction and the combination and arrangement of parts may be resorted to without departing from the true spirit and the scope of the invention as hereinafter claimed.

I claim:

1. In an adjustable filter comprising a plurality of annular filter discs and a support assembly including first and second end fittings and an intermediate elongated foraminous core, and in which the filter discs are disposed in abutting relation and collectively encircle and extend substantially the entire length of said foraminous core, the improvement which comprises: said annular filter discs being axially compressible and being retained on said foraminous core by said first end fitting, a loading member rotatably mounted on said second end fitting and having a loading surface positioned to apply axial pressure to said plurality of abutting annular filter discs, said loading member being adapted to move axially of said foraminous core in one direction on clockwise rotation and in the opposite axial direction on counterclockwise rotation, said axial movement of said loading member in one direction producing an increase in the axial load on said filter discs and said axial movement of the loading member in the opposite direction causing a decrease in the axial load on said filter discs, whereby the degree of compression of said compressible filter discs and the filter rating of said filter can be varied, and indicating means for readily selecting the desired filter rating including indicia defined upon said loading member and a cooperating indicator mounted on said filter.

2. In an adjustable filter comprising a plurality of annular filter discs and a support assembly including first and second end fittings and an intermediate elongated foraminous core, and in which the filter discs are disposed in abutting relation and collectively encircle and extend substantially the entire length of said foraminous core, the improvement which comprises: said annular filter discs being axially compressible and being retained on said foraminous core by said first end fitting, a loading member rotatably mounted on said second end fitting and having a loading surface positioned to apply axial pressure to said plurality of abutting annular filter discs, said loading member being adapted to move axially of said foraminous core in one direction on clockwise rotation and in the opposite axial direction on counterclockwise rotation, said axial movement of said loading member in one direction producing an increase in the axial load on said filter discs and said axial movement of the loading member in the opposite direction causing a decrease in the axial load on said filter discs, whereby the degree of compression of said compressible filter discs and the filter rating of said filter can be varied, said first end fitting includes mounting means for receiving one end of said foraminous core, an outlet port for said filter, and means providing an annular support surface for retaining said filter discs on said core, said second end fitting includes mounting means for receiving the other end of said core and an axial adjusting member having a threaded portion, and said loading member has a threaded aperture for receiving and engaging in threaded relation the threaded portion of said second end fitting, indicating means for readily selecting the desired filter rating including indicia defined upon said loading member and a cooperating indicator mounted on said filter.

3. An adjustable filter according to claim 2 wherein each of said filter discs comprises a metal washer-shaped member and a mat of resilient filter material secured to at least one planar surface of said washer-shaped element, said mat of resilient filtering material comprising a random array of metal fibers.